J. R. FLANNERY AND E. I. DODDS.
STAY BOLT STRUCTURE.
APPLICATION FILED FEB. 16, 1921.
1,403,761. Patented Jan. 17, 1922.
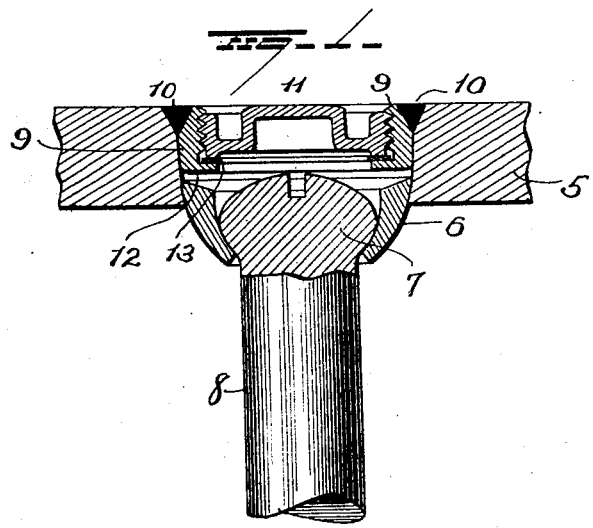
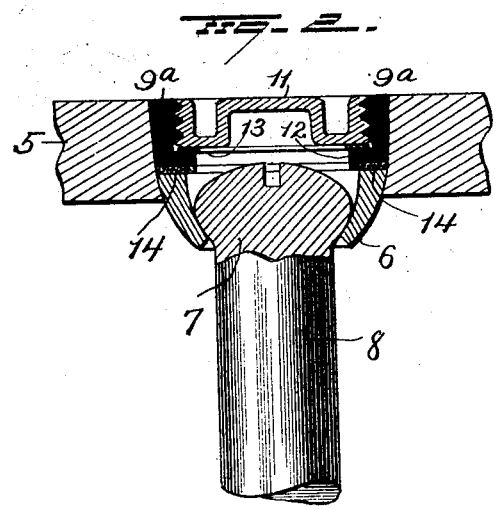

UNITED STATES PATENT OFFICE.

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAY-BOLT STRUCTURE.

1,403,761.  Specification of Letters Patent.  Patented Jan. 17, 1922.

Application filed February 16, 1921. Serial No. 445,455.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pensylvania and New York, respectively, have invented certain new and useful Improvements in Stay-bolt Structures; and we do hereby declare the following to be a full, clear and exact description of the invention, such as will enable others skilled in the art to which it appertains to make and use the same.

This invention relates to improvement in staybolt structure, the object being to provide improved means for mounting the stay bolt head in the outer sheet of the boiler whereby the bearing member for the bolt head may have a limited universal movement on its seat and the stay bolt have a universal movement in its bearing member, and it consists in the parts and combination of parts as will be more fully explained and pointed out in the claims.

In the accompanying drawings; Figure 1 is a view in section of our improvement and Figure 2 is a similar view of a modification thereof.

5 represents the outer sheet of a boiler having a bolt opening therein, the walls of said opening being preferably formed in the arc of a circle and widest at the top, and 6 is a bolt bearing member semi-spherical in shape and mounted within the said bolt opening, the outer end of the bolt bearing member terminating intermediate the inner and outer surfaces of the sheet 5.

The bearing member 6 is provided with a rounded or curved seat for the head 7 of the bolt 8, which latter is secured at its inner end (not shown) to the inner sheet of the boiler in the usual and well known manner. The outer face of the bearing member conforms in shape and diameter to the lower portion of the bolt opening in the sheet 5 so that it may have a universal movement therein whereby the bolt may be set at right angles, or oblique to the plates and that the long axis of the bolt bearing member be parallel or coincident with the long axis of the bolt. The bolt bearing member is held in place against outward displacement, but free to have a limited universal movement, by the collar 9 which latter is shown welded at 10 to the sheet 5. The inner edge of this collar is removed or separated a limited distance from the outer or larger end of the bolt bearing member 5 so as to permit of a limited universal movement of the latter, and it is threaded internally to engage the threaded cap 11 and also provided with an internally projecting seat or flange 12 carrying a gasket 13 on which the cap 11 seats to form a steam tight joint.

With this construction it will be seen that the bearing member 6 while held against outward displacement by the collar 9, is free at all times to move with the bolt 8 or independently of the latter to accommodate itself to the movement of the bolt or the boiler sheets connected by the bolt, and by removing the cap 11 the bolt head will be exposed for testing the bolt.

In the construction shown in Figure 2 the collar 9ª which is the equivalent of the collar 9 of Figure 1 is a built up structure formed by welding a welding compound or mixture directly to the sheet 5, and is initially separated from the bolt bearing member by the disk or ring 14 which is made of material that will be dissolved by steam or water, so that after the parts have been assembled it will be dissolved or disintegrated thus leaving the bolt bearing member free for universal movement to a limited extent, as in the construction shown in Figure 1. In forming the built up collar 9ª which is formed of welding material, a suitable core is used which may be withdrawn or broken up after the built up collar 9ª has been formed. After the collar has been formed it may be counterbored if necessary and threaded at its outer end to receive the threaded cap 11, which as in the former instance is seated on a seat or flange so as to form a steam tight joint.

In both structures space is left between the bearing member and cap for the longitudinal movement of the bolt, and in both instances the cap forms an abutment for the bolt head and takes all stresses due to a collapsing movement of the sheets.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent is:—

1. In a stay bolt structure, the combination of a boiler sheet having a bolt opening therein, a bolt bearing member mounted in said opening to have a universal turning movement therein, and means secured to the outer sheet and removed from the bearing member to permit of and limit the universal turning movement of the latter.

2. In a stay bolt structure, the combination of a boiler sheet having a bolt opening therein, a bolt bearing member mounted for universal movement in said opening, and a collar permanently secured to the sheet and forming a stop for limiting the movement of the bolt bearing member.

3. In a stay bolt structure, the combination of a boiler sheet having a bolt opening therein, a bolt bearing member mounted for universal movement in said opening, a threaded collar permanently secured to the sheet and forming a stop for limiting the movement of the bolt bearing member and a threaded cap detachably secured to said threaded collar.

4. In a stay bolt structure, the combination of a boiler sheet having a bolt opening therein, a bolt bearing member mounted for universal movement in said opening, an internally threaded collar welded within the opening at the outer side of the bearing member and spaced therefrom to permit a limited universal movement of said member, the said threaded collar provided with an annular seat and a threaded cap adapted to be detachably secured to the said collar and rest on the annular seat on the same.

In testimony whereof, we have signed this specification in the presence of a subscribing witness.

JOHN ROGERS FLANNERY.
ETHAN I. DODDS.

Witness:
EDWIN SPENCER RYCE.